(12) United States Patent
Kanayama et al.

(10) Patent No.: US 6,770,381 B2
(45) Date of Patent: Aug. 3, 2004

(54) SLIDING BEARING FOR INTERNAL COMBUSTION ENGINE

(75) Inventors: Hiroshi Kanayama, Aichi (JP); Shinya Kawakami, Aichi (JP); Takashi Tomikawa, Aichi (JP); Soji Kamiya, Aichi (JP)

(73) Assignee: Taiho Kogyo Co., Ltd., Toyota (JP)

( * ) Notice: Subject to any disclaimer, the term of this patent is extended or adjusted under 35 U.S.C. 154(b) by 0 days.

(21) Appl. No.: 09/423,436

(22) PCT Filed: Feb. 22, 1999

(86) PCT No.: PCT/JP99/00776

§ 371 (c)(1),
(2), (4) Date: Nov. 9, 1999

(87) PCT Pub. No.: WO99/43963

PCT Pub. Date: Sep. 2, 1999

(65) Prior Publication Data

US 2002/0192490 A1 Dec. 19, 2002

(30) Foreign Application Priority Data

Feb. 24, 1998 (JP) .......................................... 10-041750

(51) Int. Cl.$^7$ .......................... F16C 33/00; F16C 29/00; B32B 15/04; B32B 15/20; B32B 3/00
(52) U.S. Cl. ........................ 428/626; 428/674; 428/457; 428/473.5; 428/474.4; 428/418; 428/699; 384/14; 384/276; 384/280; 384/283; 508/100

(58) Field of Search ................................ 428/626, 624, 428/615, 674, 457, 458, 473.5, 474.4, 418, 460, 704, 699; 29/898, 898.042; 384/14, 276, 280, 283, 457; 49/420; 148/906; 184/5, 6.8, 6.5, 100; 508/100

(56) References Cited

U.S. PATENT DOCUMENTS

| 5,620,262 A | * | 4/1997 | Kumada et al. ............. 384/283 |
| 5,700,093 A | * | 12/1997 | Hiramatsu et al. .......... 384/276 |
| 6,025,081 A | * | 2/2000 | Ohshiro et al. ............. 428/644 |
| 6,254,701 B1 | * | 7/2001 | Oshiro et al. ............... 148/432 |

FOREIGN PATENT DOCUMENTS

| EP | 0 795 693 | | 9/1997 |
| JP | 8-165420 | | 6/1996 |
| JP | 9-125176 | | 5/1997 |
| JP | 9-249924 | | 9/1997 |
| WO | 97/15695 | * | 5/1997 |

\* cited by examiner

*Primary Examiner*—Michael La Villa
(74) *Attorney, Agent, or Firm*—Armstrong, Kratz, Quintos, Hanson & Brooks, LLP

(57) ABSTRACT

A sliding bearing for an internal combustion engine including a copper-based bearing alloy including silver and tin upon which an overlay is applied. The overlay comprises resin and MoS$_2$, and the adherence of the overlay to the alloy is enhanced by a roughened alloy surface formed of grooves extending in the sliding direction.

12 Claims, 2 Drawing Sheets

SLIDING BEARING FOR INTERNAL COMBUSTION ENGINE

TECHNICAL FIELD

The present invention relates to a sliding bearing for an internal combustion engine, and more particularly to a sliding bearing consisting of a copper-based bearing alloy, on which an overlay is applied.

BACKGROUND TECHNIQUE

The present applicant proposed in (1) Japanese Unexamined Patent Publication No. 9-249,924 and (2) European patent publication No. 0795693A2 a copper alloy, which has a particular structure considerably exceeding the properties of the kelmet used heretofore as the sliding-bearing alloy of an internal combustion engine. The alloy proposed in publication (1) is a copper alloy, which contains As; Sn, Sb, In, Mn, Fe, Bi, Zn, Ni and/or Cr as the solute element(s) of a Cu matrix and, further, essentially no secondary phase consisting of or containing these elements is formed. Likewise, the surface layer of the sliding-bearing alloy proposed in (2) is exposed when an overlay is locally worn out during the initial breaking-in of the overlay. At least a portion of the exposed surface layer consists of a copper alloy in which the above-mentioned elements such as Ag and the like are concentrated. At least the boundary of the bulk portion contiguous to the copper-alloy surface and its vicinity contain the above-mentioned elements such as Ag and the like in the solid solution and consists of such solid solution is essentially free from a secondary phase consisting of or containing these elements.

The sliding bearing proposed in the above-mentioned publication (2) consists of a copper alloy, which contains Ag, Sn, Sb, In, Al, Mg and/or Cd, and Cu essentially in balance, and which is bonded to the backing metal. Ag and the like are solid-dissolved in the Cu matrix at least in the vicinity of the sliding surface. Essentially no secondary phase, such as an Ag phase, is formed. A phase, which contains a hexagonal compound of Ag and the like with one another or Ag and the like with Cu, a compound of the Ag and the like with sulfur and oxygen, or an eutectic, is formed on the surface caused to slide with an opposing shaft.

An overlay is unnecessary or an extremely thin overlay is sufficient for the sliding bearings proposed in these publications (1) and (2), because the seizure resistance of the copper alloys in these publication is improved.

Incidentally, when a sliding bearing is used under high surface pressure, the shaft deflects by a few microns, with the result that the localized surface pressure of the bearing becomes so high that seizure is liable to occur at such portions. The life of a sliding is therefore limited from the aspect of surface pressure. In the most general kelmet bearing (thickness of lining=0.2 mm, Ni barrier=2 μm, Pb-based overlay=20 μm) the life of such kelmet is a million km under surface pressure of 7 MPa. Surface pressure of 70 MPa corresponds to an engine with 4000–8000 cc of displacement, equipped with a turbo-charger.

It is expected that the sliding-bearing alloys proposed in the above-mentioned publications (1) and (2) exceed the surface pressure mentioned above. However, the above mentioned publications (1) and (2) give no consideration as to which overlay is optimum for a sliding bearing used under high surface pressure. The present inventors tested, therefore, various overlays and carried out research for the purpose of providing a sliding bearing for an internal combustion engine capable of being used under higher load than heretofore.

DISCLOSURE OF INVENTION

The sliding bearing of an internal combustion engine according to the present invention is characterized in that: a copper alloy contains from 0.1 to 2% by weight of Ag and from 1 to 10% by weight of Sn as the essential elements, the balance essentially consisting of Cu, is bonded to a backing metal, and has on its side opposite to the backing metal a roughened surface of approximately 0.5 to approximately 10 μm of roughness (Rz); the roughened surface is coated with at least one thermo-setting resin, which is selected from the group consisting of polyimide resin, polyamide-imide resin, epoxy resin and phenol resin, and which contains from 55 to 95% by weight of $MoS_2$; Ag and Sn are solid-dissolved in the Cu matrix of the copper alloy in at least the vicinity of the sliding surface where essentially no secondary phase of these elements is formed; and, a concentrated layer of said Ag and Sn, a hexagonal compound of these Ag and Sn with one another, a hexagonal compound of Cu and these elements, or a eutectic of Ag and Sn or Cu and these elements, is formed as a sub-layer of at least a portion of the sliding layer, which portion is brought into direct contact with an opposing shaft.

In addition, according to an embodiment of the sliding bearing, there is provided a sliding bearing for an internal combustion engine: wherein its copper alloy contains 10% by weight or less of at least one additive element selected from the group consisting of Ab, In, Al, Mg and Cd; the essential elements and the additive elements are solid-dissolved in the Cu matrix of the copper alloy in at least the vicinity of the sliding surface where essentially no secondary phase of these elements is formed; and, a concentrated layer of said essential and additive elements, a hexagonal compound of these elements with one another, a hexagonal compound of Cu and these elements, or a eutectic of said essential elements and additive elements or Cu and these elements, is formed as a sub-layer of at least a portion of the sliding layer, which portion is brought into direct contact with an opposing shaft.

The present invention is described hereinafter in detail.

First, the copper alloy used in the present invention is explained. This copper alloy is based on the publications (1) and (2) by the present applicant mentioned above. Specifically, the following points are utilized. The particular additive elements, which are solid-dissolved in the Cu matrix, move to the lining surface, while friction heat generates and the structure of the lining surface changes. The particular additive elements then locally form a concentrated layer. A hexagonal compound or a eutectic composition, which is formed as the concentration progresses to some extent, has excellent solid-lubrication effect and excellent sliding performance under high surface pressure.

In basic experiments the seizure resistance of various compounds was investigated. The results are hereinafter explained.

A metal sheet or an alloy sheet, the composition of which is shown in Table 1, was cast or rolled and heat-treated to form a hexagonal compound shown in the equilibrium phase-diagram. However, the heat treatment was not carried out for No. 3 having a eutectic composition. The sheet was then worked in the form of a specimen (1 $cm^2$ of the surface area, 1.0–1.5 μm of roughness Rz). The specimens were subjected to a test of seizure resistance under the following conditions.

Tester: a pin-on disc tester shown in FIG. 2

Sliding Speed: 15 m/s

Load: Gradual increase of load (step mode), 500N/10 min

Kind of oil: 10 w-30

Temperature of oil: room temperature

Opposed material: hardened S55C (Hv 550–650), roughness—0.5–0.8 μm Rz

In FIG. 2: 5—oil-feeding pad; 6—hydraulic cylinder; 7—a test piece; 8—disc; 9—balance weight; and 10—a load cell.

The results are shown in Table 1.

TABLE 1

| | Composition (wt %) | | | Seizure Load | Material |
|---|---|---|---|---|---|
| No. | Cu | Ag | Sn | Others | (kg/mm²) | Structure |
| 1 | — | 72 | 28 | — | 860 | h-Ag₃Sn(ε) |
| 2 | — | 85 | 15 | — | 840 | h-Ag—Sn(ζ) |
| 3 | — | 3 | 97 | — | 900 | Ag—Sn eutectic |
| 4 | — | 25 | — | Cd = 75 | 800 | h-Ag—Cd(ε) |
| 5 | — | 73 | — | In = 27 | 880 | h-Ag₃In(ζ') |
| 6 | — | 60 | — | Mg = 40 | 800 | h-Mg₃Ag(ε) |
| 7 | — | 73 | — | Sb = 27 | 820 | h-Ag₃Sb(ε) |
| 8 | — | 85 | — | Sb = 15 | 840 | h-Ag—Sb(ζ) |
| 9 | — | 87 | — | Al = 13 | 900 | h-Ag—Al(ζ) |
| 10 | 1 | — | 99 | — | 760 | h-Cu—Sn eutectic |
| 11 | 15 | — | — | Cd = 85 | 800 | h-Cd₃Cu(ε) |
| 12 | 52 | — | — | Cd = 48 | 780 | h-CdCu₂ |
| 13 | 67 | — | — | Sb = 33 | 800 | h-Cu₄.₅Sb(ε) |
| 14 | — | — | 95 | Cd = 5 | 820 | h-Cd—Sn(β) |
| 15 | — | — | 79 | In = 21 | 880 | h-InSn₄(γ) |
| 16 | 100 | — | — | — | 400 | Metallic Cu |
| 17 | — | 100 | — | — | 450 | Metallic Ag |
| 18 | — | — | 100 | — | 420 | Metallic Sn |
| 19 | — | — | — | In = 100 | 420 | Metallic In |

As is apparent from Table 1, the compounds or eutectic of Nos. 1–15 have seizure resistance approximately 1.5 times or more as high as that of the pure metal such as Cu, Ag or Sn. Although the seizure resistance of metallic Ag (No. 17) and the metallic Sn (No. 18) are poor, No. 3 (eutectic), in which these metals are finely mixed, has high seizure resistance. An effect due to the coexisting different elements is thus recognized. Enhancement of seizure resistance due to the hexagonal compound is believed to be due to the co-presence effect of the different elements, and cleavage of the hexagonal compound. MoS₂, graphite, h—BN and the like having a hcp structure, have cleavage property and thus low-friction property, with the result that the seizure resistance is enhanced. This fact would similarly explain how the seizure resistance is enhanced in the present invention by the hexagonal compound.

Materials including No. 1 (h-Ag₃Sn), No. 3 (AgSn eutectic), and No. 10 (Cu—Sn eutectic) of Table 1 were subjected to a basic test for measurement of the friction coefficient and adhesion resistance. The test was carried out under the following conditions.

Tester: A Bouden/Teber stick-slip tester shown in FIG. 3

Sliding Speed: 0.06 m/s

Load: 5N

Lubricating Condition: application of oil

Opposed Material: SUJ 2 (8 mm in diameter)

In FIG. 3: 11—pin; 12—test specimen: and 13—heater

The results are shown in Table 2.

TABLE 2

| | | | | | Stick Slip | | |
|---|---|---|---|---|---|---|---|
| | Composition (wt %) | | | Generation Temperature | Friction Coefficient | Adhesion |
| No. | Cu | Ag | Sn | (° C.) | at Generation | Area(μm²) |
| 1 | — | 72 | 28 | 170 | 0.45 | 300 |
| 3 | — | 3 | 97 | 165 | 0.48 | 600 |
| 10 | 1 | — | 99 | 160 | 0.50 | 700 |
| 16 | 100 | — | — | 100 | 0.40 | 2000 |
| 17 | — | 100 | — | 180 | 0.50 | 500 |
| 18 | — | — | 100 | 160 | 0.50 | 1100 |

From Table 2, it is revealed that No. 1 of the hexagonal compound is the most resistant to adhesion. Pure Ag (No. 17) is the second most resistant to adhesion. The adhesion resistance of the eutectic (No. 3) and the hexagonal compound (No. 1) is excellent. The resistance to adhesion of pure Sn is the lowest. The resistance to adhesion of pure Cu is the worst.

Based on the results of the basic experiments, Ag and Sn turned out to be the most effective elements for forming on the surface of a lining a hexagonal compound(s) or eutectic and hence enhancing the seizure resistance The present inventors further advanced the research and discovered that it is important to once solid-dissolve the Ag, Sn or the like in the lining before use, that is, these additive elements should not form the secondary phase before use. More specifically, no secondary phase should be identified, under the X-ray diffraction condition described hereinbelow, in the alloy's surface portion participating in the sliding. When a secondary phase is formed, no matter whether the solute element(s) of the copper-alloy matrix is in an equilibrium state or non-equilibrium state, the concentration of the additive element(s) in the lining surface after sliding is difficult.

The common properties of the above additive elements, such as Ag, Sn, Cd, In, Mg, Sb and Al are as follows. (a) They are liable to be alloyed with copper and do not considerably harden copper. (b) They are highly resistant to deteriorated lubricating oil. (c) They are liable to concentrate on the lining surface. (d) They exhibit improved friction coefficient, corrosion resistance, non-adhesiveness and the like under the co-presence of different kinds of elements. (e) They are soluble in the solid solution. (f) They do not easily precipitate. (g) They form a hexagonal compound or a eutectic.

Other elements than the above-mentioned ones, for example Ca and Na, do not fulfill (a). Pb cannot be employed in the light of (b). V and W having a large mass are difficult to diffuse in the copper alloy and therefore do not satisfy (c). Pb and Bi have such large difference in the melting point from that of Cu that it is difficult to minimize the phase separation during casting. Pb and Bi, therefore, do not satisfy (e).

The following points are necessary in the present invention. That is, the solid-solution state of the additive element (s) is maintained in the copper alloy during a certain period of use of the bearing. As the friction progresses, solid contact between the shaft and the lining occurs frequently. When such a condition arises, the additive element(s) concentrate on the sliding surface of the lining. Since an element, which is liable to precipitate, easily forms a secondary phase, the amount of the solute element as a source of the concentrated layer is disadvantageously diminished. The condition (f) is, therefore, also important, and the additive elements of the known precipitation-type alloys are excluded from the present invention.

The hexagonal compound mentioned in (g) is, for example, an Ag—Sn compound (ζ-zeta phase). This hexagonal compound is formed when Ag and Sn are present on the surface of a bearing in a weight ratio of Ag: Sn of 85 to 15 or its vicinity, and exceed their solubility in Cu, and further, energy is imparted to form a compound. This energy is the bearing temperature under the normal sliding condition of a bearing being used, for example 120° C. or more in terms of the oil temperature. Note that Ag and Sn are solid-dissolved in the Cu alloy matrix, preferably in super-saturation; and, further, no secondary phases of these elements are formed in the matrix. Alternatively, a bearing can be subjected, prior to use, to the same conditions as mentioned above. That is, a bearing is exposed to pressure equivalent to that from a shaft and to heat equivalent to the oil temperature, so as to impart a temperature gradient equivalent to that during use. These elements thus concentrate on the surface of a bearing. Although the sliding performance can be enhanced even under such a concentration state, it can be further enhanced when these elements partly form a hexagonal compound. Evidently, the sliding performance can be further enhanced with an increase in the proportion of the hexagonal compound.

The eutectic mentioned in item (g) is basically the same as the hexagonal compound. Noteworthy points of the eutectic are explained with regard to a Cu—Ag—Sn system having an eutectic at 3.5% by weight of Ag and 96.5% of Sn, between Sn and $Ag_3Sn$ which is an intermetallic compound having a relatively low melting point. When Ag and Sn, are once (super-saturation) dissolved in the Cu—Ag—Sn alloy, then concentrated on the surface layer of a bearing, such a structure is formed. That is, $Ag_3Sn$ and Sn disperse finely and thinly on the surface of a Cu matrix. As a result, the seizure resistance is greatly enhanced as compared with that attained by concentration of a single element, as shown in Tables 1 and 2.

The equilibrium solid-solution amount of the above-mentioned elements in a binary alloy is determined by a phase diagram (M. Hansen, Constitution of Binary Alloys, McGraw Hill Company, New York, 1964), for example, 0.1% by weight for Ag, 1.3% by weight for Sn, and 0.5% by weight for Cd at approximately 200° C. In a ternary alloy, practical determination of the equilibrium solid-solution amount can be made such that, when any one of the additive elements exceeds the equilibrium solubility of a binary alloy, the solute elements in a non-equilibrium state are contained in such a ternary alloy.

The copper alloy, which contains the additive element(s) in a non-equilibrium state, is produced preferably by the casting method or atomizing method. In the casting method, the melt is cooled at a cooling speed of 100° C./minute or higher, which forces the additive element(s) to dissolve in the Cu matrix. The working steps may be carried out subsequent to the casting in such a manner that the dissolved element(s) do not precipitate. However, since such working step must be carried out very carefully, a continuously cast strip is preferably used as a lining as it is. In the case of the sintering method, the atomized powder, which is produced by high-speed cooling of the copper-alloy melt, is then subjected to sintering at a solution temperature of the additive element(s), followed by rapid cooling at a cooling speed of 50° C./minute or higher. In addition to the above additive element(s), from 0.01 to 0.5% of P can be added as a de-oxidizing agent or a sinter-promoting agent.

The balance of the above composition is impurities ordinarily contained in the copper, such as Si, O and the like. The purity of copper may be such as that of tough-pitch copper, electric copper, electrolytically refined copper, and OFHC (Oxygen Free High Conductivity Copper). S, which is permissible as an impurity, has virtually no solubility in Cu and is, therefore, present as the Cu—S secondary phase.

When the copper alloy according to the present invention is rendered in the form of sintered material, the sintered pores may be impregnated with resin. Almost all resins used as the sliding material can be used as the impregnating resin. They are preferably PI, PAI, PEI, PEEK, aromatic PA, phenol resin, epoxy resin, PTFE and, in addition, fluorine resin (PFA, ETFE and FEP). The amount of resin is preferably from 30 to 80% by volume, more preferably from 40 to 60% by volume. Porosity of the sintered material is preferably from 70 to 20% by volume, more preferably from 60 to 40% by volume. When PTFE and other fluorine resin are used, the porosity of sintered material may be small, for example from 60 to 20%.

A solid lubricant, wear-resistant additive or the like can be mixed in the impregnating resin. Specifically, the solid lubricant is such as graphite, PTFF, Pb, Pb-Sn alloy, carbon fluoride, and lead fluoride. The wear-resistant additives are $Al_2O_3$, $SiO_2$, $Si_3N_4$, clay, talc, $TiO_2$, mulite, calcium carbide, Zn, AlN, $Fe_3P$, $Fe_2B$, $Ni_2B$, FeB, and spheroidal carbon. In addition, inorganic fiber, such as glass fiber, carbon fiber, potassium titanate fiber and the like can be used. Organic fiber, such as aromatic PA fiber, whisker such as SiC whisker, and metal fiber such as Cu fiber, stainless steel fiber and the like can also be used.

The rolled or sintered copper alloy for a sliding bearing may be bonded on the metal backing to provide a sliding bearing, or may also be in the form of a solid bearing not bonded on the metal backing.

The copper alloy according to the present invention is used for various bearings for an engine, a connecting-rod bearing and other bearings of an internal combustion engine.

When the surface of the lining is analyzed by SIMS (Secondary Ion Mass Spectroscopy) method after sliding, concentrated regions of the additive element(s) are detected. Such concentrated layer is very thin, of thinness of 1 μm or less. The concentration of the additive element(s) in the concentrated layer is, for example, 1.3 times or more as high as that in the alloy bulk. A part of the concentrated elements is converted to a hexagonal compound or a eutectic. The hexagonal compound or eutectic is liable to form in a region where the concentration ratio is twice or higher. When the sliding further advances, the concentrated layer reacts with sulfur in the lubricating oil, with the result that the seizure resistance is enhanced.

The base oil of the lubricating oil and its additives, which are used in the present invention, is not limited at all. The sulfur-based additives, which may be used as an additive, are such compounds as (poly)sulfide, sulfonate, sulfinate, sulfenate, the phenate having the structure formula given below, (di)thiophsphate compound, thioketone, thioacetal, thiocarbonic acid and its derivative(s), sulfoxide and its derivative(s), sulfonyl, sulfinyl, sulfenyl, and ZnDTP. Each of these organic-acid compounds decomposes at 100–160° C., which is the sliding temperature of a sliding bearing, into a reactive sulfuric-acid based acid which is then caused to react with the concentrates on the surface of the copper alloy.

EMBODIMENTS OF INVENTION

Figure 1:
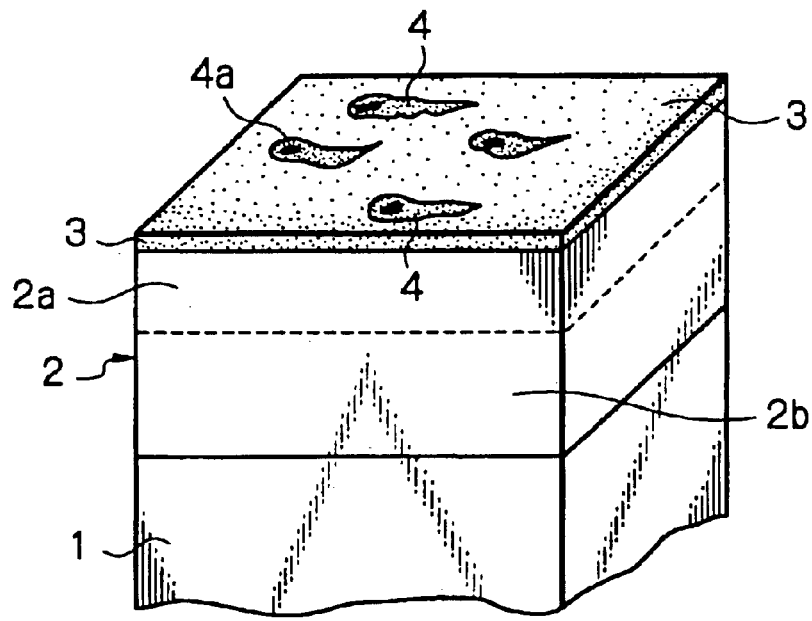
FIG. 1 is a schematic drawing showing the structure of a sliding bearing according to the present invention.
Figure 2:
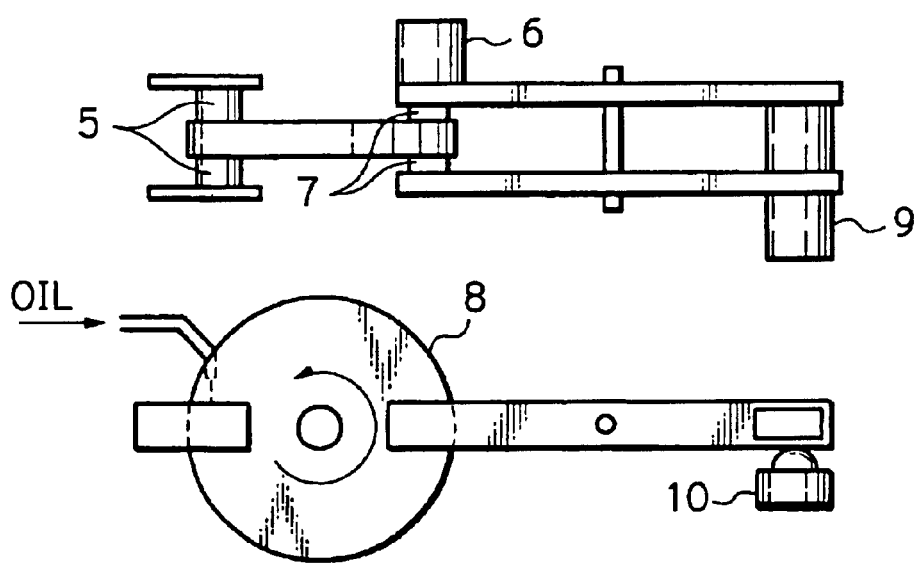
FIG. 2 is a drawing of a pin-on disc type tester.
Figure 3:
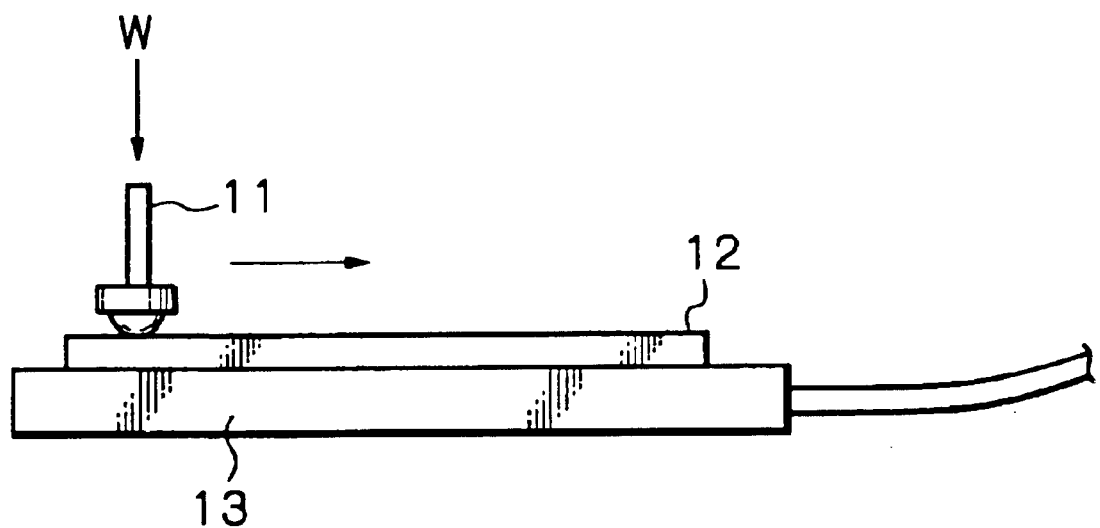
FIG. 3 is a drawing of a Bouden/Teber type stick slip tester.

Subsequent to the description of the copper alloy, the sliding bearing according to the present invention is explained with reference to FIG. 1, which is a schematic drawing.

The metal backing consists of, for example, a steel sheet and is denoted by 1. The lining 2 is bonded to the metal backing 1 by means of pressure-bonding or sintering. As a result of abrasion-out of the overlay, the surface of lining 2 is exposed. On the surface of lining 2 is formed a 1 μm or less thick concentrated layer 3, in which Ag, Sn and the like are concentrated. These elements are highly concentrated in the layer 3 as the highly concentrated layer 4. In a portion of the highly concentrated layer 4, a hexagonal compound or eutectic composition 4a is formed. For convenience, the hexagonal composition or eutectic composition is hereinafter referred to as "hexagonal compound 4a".

The backing metal 1 is a soft-steel sheet, an alloyed-steel sheet or its surface-treated sheet (shot-blasting, pickling, plating or the lie). Usually, the lining 2 entirely consists of the alloy having the inventive characterizing solid-solution structure. Ag, Sn and the like are supplied from the bulk 2a and concentrated in the layer 3 to form the hexagonal compound 4a. When the lining wears out further as compared with the condition shown in FIG. 1, Ag and Sn are supplied from a more inner portion of the bulk 2a and form anew concentrated layer 3. Excellent sliding properties can, therefore, be maintained for a long period of time. In order to realize such concentration and formation of the compound, the solute element(s) should be present in the interface and vicinity of the concentrated layer 3. The vicinity herein is related to the wear amount of the lining and the diffusion distance of Ag, Sn and the like but is from approximately 30 μm from the surface of the lining before use, provided that the maximum wear amount of the lining is 20 μm in the automotive bearings. Even if Ag and Sn during sliding and the like partly precipitate in portion 2b deeper than 30 μm from the lining surface before use, the performance of the inventive sliding bearing is not lowered.

The overlay, which is the most characteristic feature of in the present invention, is next explained.

As is described hereinabove, the copper alloy according to the present invention has improved seizure resistance, but is liable to seize under high surface pressure during use, since abrasive wear occurs before the satisfactory formation of the concentrated layer and the hexagonal compound 4a. Therefore, experiments and research were carried out to determine what kind of an overlay could realize the direct contact between the shaft and bearing, on which the formation of a concentrated layer and the like has advanced to a satisfactory level.

The ordinary lead-based overlay, which was tested at first, could not realize the desired performance because the lubricating oil corroded it. It turned out that the mechanochemical corrosion due to complex mechanical and chemical factors advances rapidly under a particularly high surface pressure. The tin-based overlay has slightly better performance than that of the lead-based overlay but did not achieve essential improvement. The resin-extreme pressure agent-based overlay among the resin-based overlays revealed that the effect of extreme-pressure agent is not very significant in the lubricating oil. The resin-friction adjusting agent-based overlay revealed that a friction-adjusting agent, such as a PbO additive, is effective for lessening the friction wear but the seizure resistance of the overlay is unsatisfactory. Since above findings were obtained, the corrosion resistance of the materials mentioned below, under high pressure was tested and considered.

(a) $MoS_2$: $MoS_2$ does not have the property to react with an S component in the lubricating oil to form a sulfide, such as Pb has. Corrosion of $MoS_2$, therefore, does not occur easily. Meanwhile, $MoS_2$ subjected to shear stress wears off under cleavage and hence forms a breaking-in surface. Cleavage wear of $MoS_2$ increases, therefore, under such high surface-pressure condition as intended to apply in the present invention, but when a breaking-in surface is formed to same extent, the subsequent cleavage wear is retarded. The organic acid and the like develop into defects, minute unevenness, cleavage and the like of the sliding surface and corrosion occur. At least such corrosion of the sliding surface seems less liable to occur, when wear of the sliding surface with a shaft is stabilized as stated above. While the overlay exhibits the function as described above, concentration of Ag and the like from the bulk layer 2a of the underlying copper alloy toward the surface advances; it is expected, therefore, that the concentrated layer exhibits its function upon localized wear-off of the overlay.

Furthermore, $MoS_2$ is caused to react with and is oxidized by the water component in the oil under the heat of friction, with the result that sulfur-containing radicals such as $H_2S$ are formed. These radicals exhibit the same function as the sulfur, which is contained in the lubricating oil, and is caused to react with the above-mentioned concentrated layer.

(b) Thermosetting Resin: Mechanical fracture is a principal factor that promotes wear of resin in the lubricating oil. It is, therefore, desirable from the point of view of corrosion resistance and durability to use, as the binder of $MoS_2$, polyimide resin, polyamide-imide resin, epoxy resin and/or phenol resin, since these resins have improved heat resistance, specifically, aromatic polyimide, polyether imide, polyester imide or aromatic polyamide-imide, or the diisocyanate-, BPDA- or sulfon-modified varnish of them. Thickness of an overlay is preferably from 1 to 25 μm, more preferably from 2 to 10 μm. The content of $MoS_2$ in the overlay is from 55 to 95% by weight, more preferably from 60 to 80% by weight, so as to attain the balanced properties (a) and (b) mentioned above.

The average particle diameter of $MoS_2$ measured by the Fisher method is preferably 15 μm or less, particularly from 0.2 to 10 μm.

Components other than the $MoS_2$ and polyamide-imide resin described above can be used. That is, the following components can be used together in a total amount of 10% by weight or less.

(a) Solid lubricant such as graphite, BN, $WS_2$, Pb and the like. These have lubricating effect. Graphite has cleavage property but is inferior to $MoS_2$ in performance. When Pb is used in a large amount, corrosion becomes serious. Pb can, therefore, be used in an amount not exceeding 10% by weight.

(b) Extreme pressure agent. These are: such sulfur-containing metal components such as ZnS, $Ag_2S$, CuS, FeS, $FeS_2$, $Sb_3S_2$, PbS, $Bi_2S_3$, Cd and the like; such sulfur-containing compounds as thiraum group, morpholine disulfide, salt of dithio acid, sulfide group, sulfoxide group, sulfonic acid group, thiophosphinate group, thiocarbonate group, dithiocarbomate group, alkylthiocarbomile group, olefin and the like; halogen compound such as chlorinated hydrocarbon; thiophosphate such as zinc dithio-phosphate; and organic molybdenum compound such as molybdenum thiocarbamate. They are added into the overlay, thereby enabling the lubricating oil to be retained in the overlay and hence preventing seizure. The average particle diameter of an extreme pressure agent is preferably 5 μm or less, more preferably from 2 μm or less. The addition amount of an extreme pressure agent is from 0.5 to 10% by weight, more preferably from 1 to 5% by weight.

(c) Friction adjusting agent: Oxide such as $CrO_2$, $Fe_3O_4$, PbO, ZnO, CdO, $Al_2O_3$, $SiO_2$ and $SnO_2$ and such compounds as SiC and $Si_3N_4$ can be added to the overlay so as to keep down the occurrence of abrasive wear. The average particle diameter of the friction-adjusting agent is preferably 5 μm or less, more preferably 2 μm or less. The addition amount of the friction-adjusting agent is from 0.3 to 10% by weight, more preferably from 0.5 to 5% by weight.

It is necessary that the surface of the copper alloy, on which the overlay is applied, be roughened by shot-blasting, etching, flame-spraying, groove-formation by machining, and chemical treatment such as chemical conversion treatment. Roughness is Rz approximately 1 to 10 μm, more preferably from 2 to 6 μm. In the groove-formation, which is one of the roughening methods, the grooves extending on the surface of the copper alloy in the sliding direction can be formed by means of drilling, broaching and the like. After formation of grooves, the height of the groove apex is preferably decreased by shot-blasting and the like to attain the roughness mentioned above.

The present invention is explained in detail by way of examples.

BEST MODE FOR CARRYING OUT INVENTION

EXAMPLE 1

The atomized powder of copper alloys having the composition shown in Table 3 (150 μm or less of particle diameter) was prepared by melt cooling at 1000° C./second of cooling speed. The powder was dispersed on a 1.5 mm steel sheet (SPCC) to 2 mm. Sintering was carried out under hydrogen-gas atmosphere at 850° C. for 10 minutes, followed by cooling at 50° C./minute of cooling speed. The resultant sintered material was rolled (reduction ratio of sheet thickness –7%), so that a bimetal type bearing-material was produced. The thickness of the sintered layer of the bimetal was 0.3 mm. Before starting the seizure test, X-ray diffraction (condition: Cu tube; 30 kV, 150 mA) of the examples and the comparative examples was carried out. As a result, only the peaks of Cu were recognized. It turned out, therefore, that Ag and Sn were present as the solid solution. The surface roughness of the copper alloy after sintering was Rz 0.5 μm. Several samples were shot-blasted to roughen the surface roughness to Rz 4 μm and Rz 15 μm. Polyamide-imide resin and $MoS_2$ powder (average particle-diameter –0.5 μm) were mixed in the proportions shown in Table 3 and were applied on the roughened surface of the copper alloys. Baking was carried out at 270° C. A 6 μm thick overlay was, thus, formed.

The bimetal material was formed into a test sample of dynamic load tester. Seizure load was obtained under the condition of 3000 rpm of revolution speed and lubricating oil (7.5W–30, 140° C.), while load was increased by 10 MPa at intervals of 30 minutes. In addition, the surface, where seizure occurred, was Auger-analyzed to measure the concentration of the surface layer in terms of the concentration ratio relative to that in the bulk. The results are shown Table 3.

Test Sample No. 1 of Example 1 was subjected to sliding for 20 hours and then to X-ray diffraction of the surface layer. Incidentally, the X-ray diffraction data of the hexagonal $Ag_3Sn$ according to ASTM (4-0800, MINOR CORRECTION Edition) is (d=2.29 nm; $I/I_1$=100; d=2.39 nm, $I/I_1$=80; d=1.76 nm, $I/I_1$=80; d=2.36 nm, $I/I_1$=60). These data and the measurement results shown in the drawing are in good agreement with one another. It could therefore be confirmed that ε—$Ag_3Sn$ was formed on the surface layer.

TABLE 3

| | Copper Alloy | | | | | |
|---|---|---|---|---|---|---|
| No. | Entire Composition | Surface-Layer Concentration Ratio Sn | Ag | Surface Roughness (μm) | Overlay (%) | Seizure Surface-Pressure |
| 1 | Cu—1Ag—5Sn | 1.6 | 2.1 | 4 | PAI-70$MoS_2$ | 100 MPa or more |
| 2 | Cu—1Ag—5Sn | 1.7 | 2.2 | 4 | PAI-55$MoS_2$ | 100 MPa |
| 3 | Cu—1Ag—5Sn | 1.6 | 2.2 | 4 | PAI-90$MoS_2$ | 90 MPa |
| 4 | Cu—2Ag—6Sn | 2.1 | 4.7 | 4 | PAI-90$MoS_2$ | 90 MPa |
| 5* | Cu—1Ag—5Sn | 1.6 | 2.0 | 0.5 | PAI-40$MoS_2$ | 60 MPa |
| 6* | Cu—1Ag—5Sn | 1.7 | 2.1 | 15 | PAI-70$MoS_2$ | 70 MPa |
| 7* | Cu—1Ag | 1.0 | — | 4 | PAI-70$MoS_2$ | 70 MPa |
| 8* | Cu—10Sn | — | 9.1 | 4 | PAI-70$MoS_2$ | 60 MPa |

Remarks: *in Table indicates a comparative example

In Table 3, the surface of the copper alloy of Comparative Example 5 is not roughened, the surface of the copper alloy of Comparative Example 6 is too rough, Sn is not added in Comparative Example 7, and Ag is not added in Comparative Example 8. The seizure resistance of all of these comparative examples is, therefore poor. Contrary to this, all of the inventive Examples 1 through 4 exhibit improved seizure resistance.

EXAMPLE 2

The following elements were added to the copper alloy No. 1 of Example 1 and the same test as in Example 1 was carried out. The following results were obtained.

1% Al—seizure surface-pressure 90 MPa
0.5% Sb—seizure surface-pressure 100 MPa
10% In—seizure surface-pressure 100 MPa or more
2% Mg—seizure surface-pressure 90 MPa
2% Cd—seizure surface-pressure 90 MPa

EXAMPLE 3

ZnS in 3% by weight as an extreme pressure agent was added to the overlay of Example 1, No. 1, and the same test was carried out as in Example 1. The seizure surface-pressure was 120 MPa.

EXAMPLE 4

PbO in 3% by weight as a friction-adjusting agent was added to the overlay of Example 1, No. 1, and the same test was carried out as in Example 1. The seizure surface-pressure was 120 MPa.

CONVENTIONAL EXAMPLE 1

The kelmet bearing described in page 2 of the present document was subjected to the same test as in Example 1. The seizure surface pressure was 70 MPa.

Industrial Applicability

As is explained hereinabove, the sliding bearing of the present invention is outstanding as the parts used in an internal combustion engine operated under high surface-pressure. The application value of the present invention is, therefore, high. In addition, the present invention has the advantage, even under ordinary surface-pressure in an internal combustion engine, that high accuracy of a shaft is not required.

What is claimed is:

1. A sliding bearing for supporting an opposing shaft movable in a sliding direction against said sliding bearing, said sliding bearing comprising:
   a backing metal, and
   a copper alloy consisting essentially of
      copper,
      from 0.1 to 2% by weight of Ag, and
      from 1 to 10% by weight of Sn,
   said alloy bonded to said backing metal, and having on its side opposite to the backing metal a roughened surface of approximately 0.5 to approximately 10 $\mu$m of roughness (Rz); said alloy having a first layer parallel to and adjacent to said backing metal, and a second layer adjacent to said first layer;
   wherein said roughened surface is coated with a coating layer comprising at least one thermo-setting resin, which is selected from the group consisting of polyimide resin, polyamide-imide resin, epoxy resin and phenol resin, and which contains from 55 to 95% by weight of $MoS_2$, and wherein said roughened surface is formed of grooves extending in the sliding direction;
   wherein Ag and Sn are solid solution in the copper alloy without forming a secondary phase of Ag and Sn in at least the area of said second layer directly adjacent said roughened surface; and,
   wherein said second layer contains a second-layer component consisting of one of:
      solid solution of Ag and Sn,
      a hexagonal compound of solid solution of Ag and Sn,
      a hexagonal compound of Cu and solid solution of Ag and Sn,
      a eutectic of solid solution of Ag and Sn, or
      a eutectic of Cu and solid solution of Ag and Sn; in higher concentration of Ag and Sn than that of said first layer.

2. A sliding bearing according to claim 1, wherein said roughened surface is further roughened by shot-blasting, etching, flame-spraying or chemical treatment.

3. A sliding bearing according to claim 1, wherein said roughened surface is formed by shot-blasting, etching, flame-spraying or chemical treatment of a surface of grooves extending in the sliding direction.

4. A sliding bearing according to claim 1, wherein the average particle diameter of said $MoS_2$ is 15 $\mu$m or less.

5. A sliding bearing according to claim 1, wherein said coating layer further contains one or more of a solid lubricant, extreme pressure agent and friction adjusting agent.

6. A sliding bearing according to claim 1, wherein the concentration of Ag and Sn in said second layer of said second-layer component is at least 1.3 times higher than that of said first layer.

7. A sliding bearing according to claim 1, wherein the first layer is formed 30 $\mu$m from the surface of the copper alloy before use.

8. A sliding bearing for supporting an opposing shaft movable in a sliding direction against said sliding bearing, said sliding bearing comprising:
   a copper alloy consisting essentially of
      copper,
      from 0.1 to 2% by weight of Ag, from 1 to 10% by weight of Sn, and
      10% by weight or less of at least one additive element selected from the group consisting of Sb, In, Al, Mg and Cd,
   said alloy bonded to a backing metal and having on its side opposite to the backing metal a roughened surface of approximately 0.5 to approximately 10 $\mu$m of roughness (Rz); and
   said alloy having a first layer parallel to and adjacent to said backing metal, and a second layer adjacent to said first layer;
   wherein said roughened surface is coated with a coating layer comprising at least one thermo-setting resin, which is selected from the group consisting of polyimide resin, polyamide-imide resin, epoxy resin and phenol resin, and which contains from 55 to 95% by weight of $MoS_2$, and wherein said roughened surface is formed of grooves extending in the sliding direction;
   wherein Ag and Sn and said at least one additive element are solid solution in the Cu matrix of the copper alloy without forming a secondary phase of Ag and Sn and said additive element in at least the area of said second layer directly adjacent said roughened surface; and,
   wherein said second layer contains a component consisting of at least one of:
      solid solution of Ag and Sn and at least one of said additive elements,
      a hexagonal compound of solid solution of Ag and Sn and at least one of said additive elements,
      a hexagonal compound of solid solution of Cu and Ag and Sn and at least one of said additive elements,
      a eutectic of solid solution of Ag and Sn and at least one of said additive elements, or
      a eutectic of Cu and solid solution of Ag and Sn and at least one of said additive elements; in higher total atomic concentration of Ag and Sn and said additive element than that of said first layer.

9. A sliding bearing according to claim 8, wherein said roughened surface is further roughened by shot-blasting, etching, flame-spraying or chemical treatment.

10. A sliding bearing engine according to claim 8, wherein said roughened surface is formed by shot-blasting, etching, flame-spraying or chemical treatment of a surface of grooves extending in the sliding direction.

11. A sliding bearing according to claim 8, wherein the concentration of Ag and Sn in said second layer of said second-layer component is at least 1.3 times higher than that of said first layer.

12. A sliding bearing according to claim 8, wherein the first layer is formed 30 $\mu$m from the surface of the copper alloy before use.

* * * * *